(12) United States Patent
Telang et al.

(10) Patent No.: US 12,394,121 B2
(45) Date of Patent: Aug. 19, 2025

(54) SYSTEMS AND METHODS FOR CONSTRUCTING AND PRESENTING A SPATIAL MODEL

(71) Applicant: Honeywell International Inc., Charlotte, NC (US)

(72) Inventors: Jayalaxmi Telang, Bangalore (IN); Ronny Scherf, Grosshernnersdorf (DE); Murugan Gopalan, Bangalore (IN); Kartikeyan Bollapalli, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 94 days.

(21) Appl. No.: 18/069,168

(22) Filed: Dec. 20, 2022

(65) Prior Publication Data

US 2024/0013455 A1 Jan. 11, 2024

(30) Foreign Application Priority Data

Jul. 11, 2022 (IN) .............................. 202211039660

(51) Int. Cl.
*G06T 11/20* (2006.01)
(52) U.S. Cl.
CPC ........ *G06T 11/206* (2013.01); *G06T 2200/24* (2013.01)
(58) Field of Classification Search
CPC .......................... G06T 11/206; G06T 2200/24
USPC ........................................................ 345/418
See application file for complete search history.

(56) References Cited

U.S. PATENT DOCUMENTS

| | | | |
|---|---|---|---|
| 9,441,983 B2* | 9/2016 | Wong | G01C 21/20 |
| 10,896,234 B2* | 1/2021 | Takahashi | G06F 16/338 |
| 10,936,979 B2* | 3/2021 | Ricard | G06F 16/256 |
| 11,055,885 B1* | 7/2021 | Schwaiger | G06T 11/206 |
| 11,539,657 B2* | 12/2022 | Rapaport | H04L 67/306 |
| 11,799,927 B1* | 10/2023 | Chanda | H04L 65/403 |
| 2003/0115211 A1* | 6/2003 | Chen | G06F 16/29 707/999.102 |
| 2004/0034666 A1* | 2/2004 | Chen | G06F 16/29 706/62 |

(Continued)

OTHER PUBLICATIONS

Wieland M, Pittore M. A spatio-temporal building exposure database and information life-cycle management solution. ISPRS International Journal of Geo-Information. Apr. 8, 2017;6(4):114. (Year: 2017).*

(Continued)

*Primary Examiner* — Phu K Nguyen
(74) *Attorney, Agent, or Firm* — ALSTON & BIRD LLP

(57) ABSTRACT

Disclosed are methods and systems for navigating a graphical user interface. A method may include, for example, receiving, at a system comprising at least one processor, spatial data associated with one or more objects within an entity organization; identifying, using the at least one processor and from the spatial data, one or more relationships between the one or more objects; generating, using the at least one processor and based on the identifying, a spatial hierarchy for the one or more objects; receiving, at the system from a user device, a visualization request for a target object from the one or more objects; and transmitting, by the system and responsive to the receiving, instructions to the user device to display a visual representation of at least a portion of the spatial hierarchy corresponding to the target object.

17 Claims, 7 Drawing Sheets

(56) References Cited

U.S. PATENT DOCUMENTS

| | | | | |
|---|---|---|---|---|
| 2008/0263088 | A1* | 10/2008 | Webster | G06F 16/29 |
| 2011/0261049 | A1* | 10/2011 | Cardno | G06Q 40/04 |
| | | | | 345/419 |
| 2020/0250352 | A1* | 8/2020 | Wodrich | G01S 5/14 |
| 2021/0105451 | A1* | 4/2021 | Oyman | H04N 19/597 |
| 2024/0013455 | A1* | 1/2024 | Telang | G06T 11/206 |

OTHER PUBLICATIONS

Solihin W, Eastman C, Lee YC, Yang DH. A simplified relational database schema for transformation of BIM data into a query-efficient and spatially enabled database. Automation in Construction. Dec. 1, 2017;84:367-83. (Year: 2017).*

Li H, Hong T, Lee SH, Sofos M. System-level key performance indicators for building performance evaluation. Energy and Buildings Feb. 15, 2020;209:109703.*

Li H, Wang Z, Hong T. Occupant-Centric key performance indicators to inform building design and operations. Journal of Building Performance Simulation. Nov. 2, 2021;14(6):814-42.*

Li Y, O'Donnell J, García-Castro R, Vega-Sanchez S. Identifying stakeholders and key performance indicators for district and building energy performance analysis. Energy and Buildings. Nov. 15, 2017;155:1-5.*

* cited by examiner

SYSTEMS AND METHODS FOR CONSTRUCTING AND PRESENTING A SPATIAL MODEL

CROSS-REFERENCE TO RELATED APPLICATION(S)

This application claims the benefit of priority to Indian Patent Application No. 202211039660, filed Jul. 11, 2022, the entirety of which is incorporated by reference herein.

TECHNICAL FIELD

Various embodiments of the present disclosure relate generally to systems and methods for constructing an object model that delineates spatial relationships between objects within a space and, more particularly, to systems and methods for presenting the object model via a graphical user interface.

BACKGROUND

Each facility or enterprise (e.g., building, organization, etc.) may be comprised of a variety of different objects (e.g., spaces, components, assets, etc.) that, over time, may need to be repaired or updated. Generally, maintenance personnel (e.g., technicians, operators, facility managers, etc.) are tasked with addressing issues that arise with these objects in order to ensure that an enterprise remains safe, functional, and comfortable. Situations may arise, however, where maintenance personnel have difficulty locating a target object and/or diagnosing an issue associated therewith. In these instances, maintenance performance may be difficult, burdensome, and/or time-consuming. Existing systems do not provide a way for maintenance personnel to be apprised of all contextually relevant information in order to efficiently complete their task.

The present disclosure is therefore directed to overcoming one or more of these above-referenced challenges.

SUMMARY OF THE DISCLOSURE

According to certain aspects of the disclosure, systems and methods for modifying an object model are described.

In one example, a method may include: receiving, at a system comprising at least one processor, spatial data associated with one or more objects within an entity organization; identifying, using the at least one processor and from the spatial data, one or more relationships between the one or more objects; generating, using the at least one processor and based on the identifying, a spatial hierarchy for the one or more objects; receiving, at the system from a user device, a visualization request for a target object from the one or more objects; and transmitting, by the system and responsive to the receiving, instructions to the user device to display a visual representation of at least a portion of the spatial hierarchy corresponding to the target object.

In some embodiments, the one or more objects may comprise one or more of: an asset, a space, and a component.

In some embodiments, the receiving the spatial data may include receiving the spatial data at a plurality of different time points; wherein initial spatial data is received at a first time point in the plurality of different time points; wherein additional spatial data is received at one or more later time points in the plurality of time points.

In some embodiments, spatial data may comprise object characteristic data associated with each of the one or more objects.

In some embodiments, the object characteristic data may comprise one or more of: an attribute, a KPI, and a service history.

In some embodiments, the visual representation of the at least a portion of the spatial hierarchy may comprise a plurality of nodes connected together by a plurality of edges; wherein each of the plurality of nodes corresponds to one of the one or more objects and wherein each of the plurality of edges corresponds to a relationship between two objects of the one or more objects.

In some embodiments, the visualization request may be indicative of a service request to address an issue with the target object.

In some embodiments, the visual representation may comprise indications of at least a subset of the one or more objects directly or indirectly impacted by the service request for the target object.

In some embodiments, the one or more objects directly impacted by the service request may be visually distinguished from the one or more objects indirectly impacted by the service request on the visual representation.

In some embodiments, the method may further comprise receiving, from the user device, modification input; and updating, based on the modification input, one or more aspects of the spatial hierarchy based on the received modification input In another example, a system may comprise: one or more memories storing instructions; and one or more processors operatively connected to the one or more memories, the one or more processors configured to execute the instructions to: receive spatial data associated with one or more objects within an entity organization; identify from the spatial data, one or more relationships between the one or more objects; generate, based on the identifying, a spatial hierarchy for the one or more objects; receive, at the system from a user device, a visualization request for a target object from the one or more objects; and transmit, by the system and responsive to the receiving, instructions to the user device to display a visual representation of at least a portion of the spatial hierarchy corresponding to the target object.

In some embodiments, the one or more objects comprise one or more of: an asset, a space, and a component.

In some embodiments, the instructions executable by the one or more processors to receive the spatial data comprise instructions executable by the one or more processors to receiving the spatial data at a plurality of different time points; wherein initial spatial data is received at a first time point in the plurality of different time points; wherein additional spatial data is received at one or more later time points in the plurality of time points.

In some embodiments, the spatial data comprises object characteristic data associated with each of the one or more objects; wherein the object characteristic data comprises one or more of: an attribute, a KPI, and a service history.

In some embodiments, the visual representation of the at least a portion of the spatial hierarchy comprises a plurality of nodes connected together by a plurality of edges; wherein each of the plurality of nodes corresponds to one of the one or more objects and wherein each of the plurality of edges corresponds to a relationship between two objects of the one or more objects.

In some embodiments, the visualization request is indicative of a service request to address an issue with the target object.

In some embodiments, the visual representation comprises indications of at least a subset of the one or more objects directly or indirectly impacted by the service request for the target object.

In some embodiments, the one or more objects directly impacted by the service request are visually distinguished from the one or more objects indirectly impacted by the service request on the visual representation.

In some embodiments, the instructions are further executable by the one or more processors to: receive, from the user device, modification input; and update, based on the modification input, one or more aspects of the spatial hierarchy based on the received modification input In a further example, a non-transitory computer-readable medium storing computer-executable instructions which, when executed by a server in network communication with at least one database, cause the server to perform operations comprising: receiving, at a system comprising at least one processor, spatial data associated with one or more objects within an entity organization; identifying, using the at least one processor and from the spatial data, one or more relationships between the one or more objects; generating, using the at least one processor and based on the identifying, a spatial hierarchy for the one or more objects; receiving, at the system from a user device, a visualization request for a target object from the one or more objects; and transmitting, by the system and responsive to the receiving, instructions to the user device to display a visual representation of at least a portion of the spatial hierarchy corresponding to the target object.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
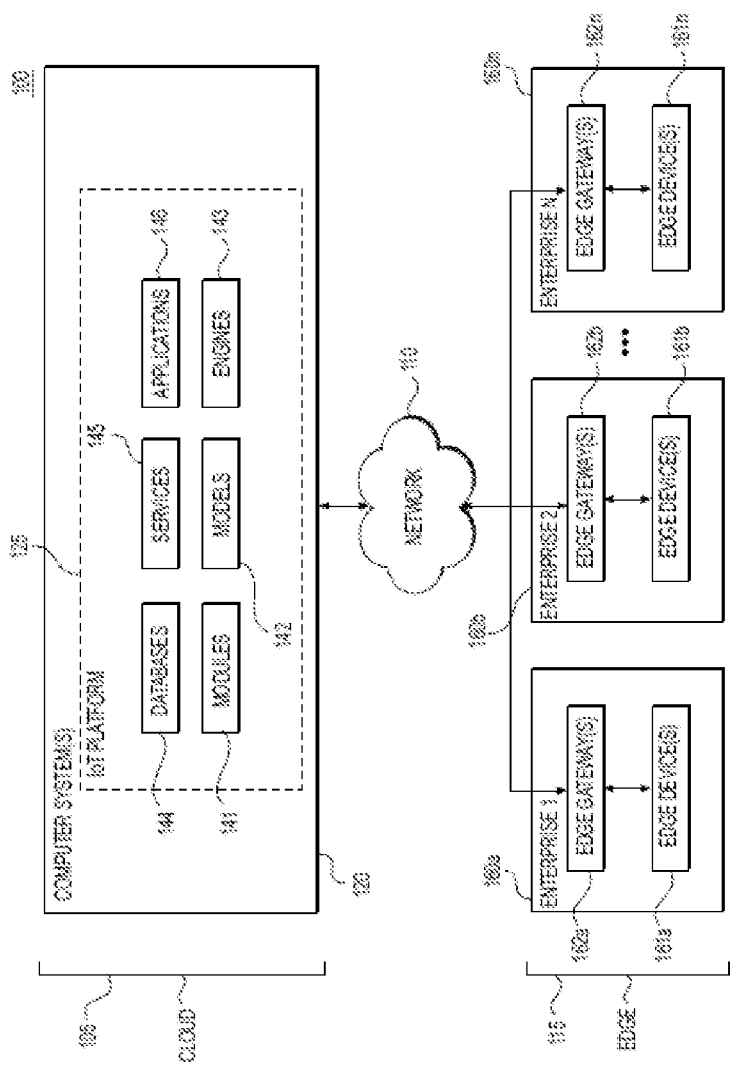
FIG. 1 depicts an exemplary networked computing system environment, according to one or more embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Various embodiments of the present disclosure relate generally to systems and methods for constructing an object model that delineates spatial relationships between objects within a space and, more particularly, to systems and methods for presenting the object model via a graphical user interface.

Maintenance personnel oftentimes are not intimately familiar with the systems and/or layouts of each facility that they are assigned to manage. More particularly, those personnel that are assigned to a new facility, or that have a number of facilities under their purview, may not know: where a target object is located within each facility, the issue(s) and/or service history associated with that target object, the effect that the target object has on other objects within the facility, and the like. Consequently, due to the lack of important context information, unnecessary time may be wasted searching for a target object and triaging service requests than on actually addressing real maintenance issues.

Enterprise performance management (EPM) tools may make large amounts of information available to a user. EPM applications may be useful in various facilities, e.g., warehouses, industrial plants, buildings, and other settings in which it is necessary to manage and monitor multiple connected devices. Dashboards of the EPM applications may be primary tools with which maintenance engineers, operators, and managers navigate available information to make day-to-day decisions, changes, and improvements to their processes to meet a wide range of targets. Such dashboards, however, may not contain all of the information needed for individuals to perform certain tasks. More particularly, the translation of object information into a digital format may occur only once, if at all, and is thereafter not updated as time progresses. As a result, maintenance engineers, operators, and managers may frequently be faced with dashboards that do not accurately represent a present state of the facility and the objects contained therein. Furthermore, conventional dashboards do not provide personnel with intuitive visual guidance to help them locate a target object within a facility.

Accordingly, a need exists for systems and methods that may generate and transmit to a user device an up-to-date hierarchical spatial model of a facility, the objects contained therein, and the various contextual relationships between the objects. More particularly, the embodiments described herein may enable 360 degree view of a space, which may include but not be limited to: key performance indicators (KPIs) applicable for a space, other connected spaces, assets serving the space, historical trends of points in a space or on assets linked to space, service cases on the assets directly serving the space or on upstream assets, and/or group communication in the form of activities on the service cases. The foregoing types of information may help obtain a holistic view of the physical model of the space in the digital world and may further aid in quicker identification of the root causes of the issues remotely.

While this disclosure describes the systems and methods with reference to an Internet-of-Things platform, it should be appreciated that the present systems and methods may be applicable to other platforms, such as financial software platforms, social media platforms, internet search platforms, and other data intensive platforms. Further, while certain details of an Internet-of-Things platform are described herein, additional descriptions of such a platform may be found in U.S. application Ser. Nos. 16/128,236, 15/956,862, 16/245,149, 16/660,122, and 16/812,027 (published as US 2019/0123959, US 2020/0084113. US 2019/0324838. US 2020/0225623, US 2021/0117436, and US 2020/0285203), which are incorporated by reference herein in their entirety.

FIG. 1 illustrates an exemplary networked computing system environment 100, according to the present disclosure. As shown in FIG. 1, networked computing system environment 100 is organized into a plurality of layers including a cloud 105, a network 110, and an edge 115. As detailed further below, components of the edge 115 are in communication with components of the cloud 105 via network 110.

Network 110 may be any suitable network or combination of networks and may support any appropriate protocol suitable for communication of data to and from components of the cloud 105 and between various other components in the networked computing system environment 100 (e.g., components of the edge 115). Network 110 may include a public network (e.g., the Internet), a private network (e.g., a network within an organization), or a combination of public and/or private networks. Network 110 may be configured to provide communication between various components depicted in FIG. 1. Network 110 may comprise one or more networks that connect devices and/or components in the network layout to allow communication between the devices and/or components. For example, the network 110 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 may be implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, computer systems 120 may include any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, the processors and data storage devices may comprise any type or combination of application servers, communication servers, web servers, super-computing servers, database servers, file servers, mail servers, proxy servers, and/or virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, the software components of computer systems 120 may include one or more software modules to communicate with user devices and/or other computing devices through network 110. For example, the software components may include one or more modules 141, models 142, engines 143, databases 144, services 145, and/or applications 146, which may be stored in/by the computer systems 120 (e.g., stored on the memory), as detailed with respect to FIG. 2 below. The one or more processors may be configured to utilize the one or more modules 141, models 142, engines 143, databases 144, services 145, and/or applications 146 when performing various methods described in this disclosure.

Accordingly, computer systems 120 may execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 may be combined to form fewer modules, models, engines, databases, services, and/or applications. In some embodiments, some of the modules 141, models 142, engines 143, databases 144, services 145, and/or applications 146 may be separated into separate, more numerous modules, models, engines, databases, services, and/or applications. In some embodiments, some of the modules 141, models 142, engines 143, databases 144, services 145, and/or applications 146 may be removed while others may be added.

The computer systems 120 are configured to receive data from other components (e.g., components of the edge 115) of networked computing system environment 100 via network 110. Computer systems 120 are further configured to utilize the received data to produce a result. Information indicating the result may be transmitted to users via user computing devices over network 110. In some embodiments, the computer systems 120 may be referred to as a server system that provides one or more services including providing the information indicating the received data and/or the result(s) to the users. Computer systems 120 are part of an entity, which may include any type of company, organization, or institution that implements one or more IoT services. In some examples, the entity may be an IoT platform provider.

In an embodiment, cloud 105 may be operably coupled with a plurality of facilities or enterprises, meaning that communication between the cloud 105 and each of the facilities or enterprises is enabled. Operational data such as telemetry data and optionally associated metadata can be uploaded to the cloud 105 for processing. Telemetry data can include time stamps and data values corresponding to those time stamps. Instructions such as operational set points can be determined within the cloud 105 and can be downloaded to a particular facility or enterprise for execution. The operational set points may include, for example, air temperature, air humidity, delta pressure (e.g. for pump, fan or damper), pump speed, chilled water temperature, hot water temperature, etc.

In an embodiment, the cloud 105 may include a server that is programmed to communicate with the facilities or enterprises and to exchange data as appropriate. The cloud 105 may be a single computer server or may include a plurality of computer servers. In some embodiments, the cloud 105 may represent a hierarchal arrangement of two or more computer servers, where perhaps a lower level computer server (or servers) processes telemetry data, for example, while a higher-level computer server oversees operation of the lower level computer server or servers.

A facility or enterprise may include a variety of different devices and controllers that communicate in different data formats, in different languages and/or different protocols. A facility or enterprise may include a variety of different devices and controllers, at least some of which communicate on different types of networks.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n may represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or vehicle that includes any number of local devices.

Figure 2:
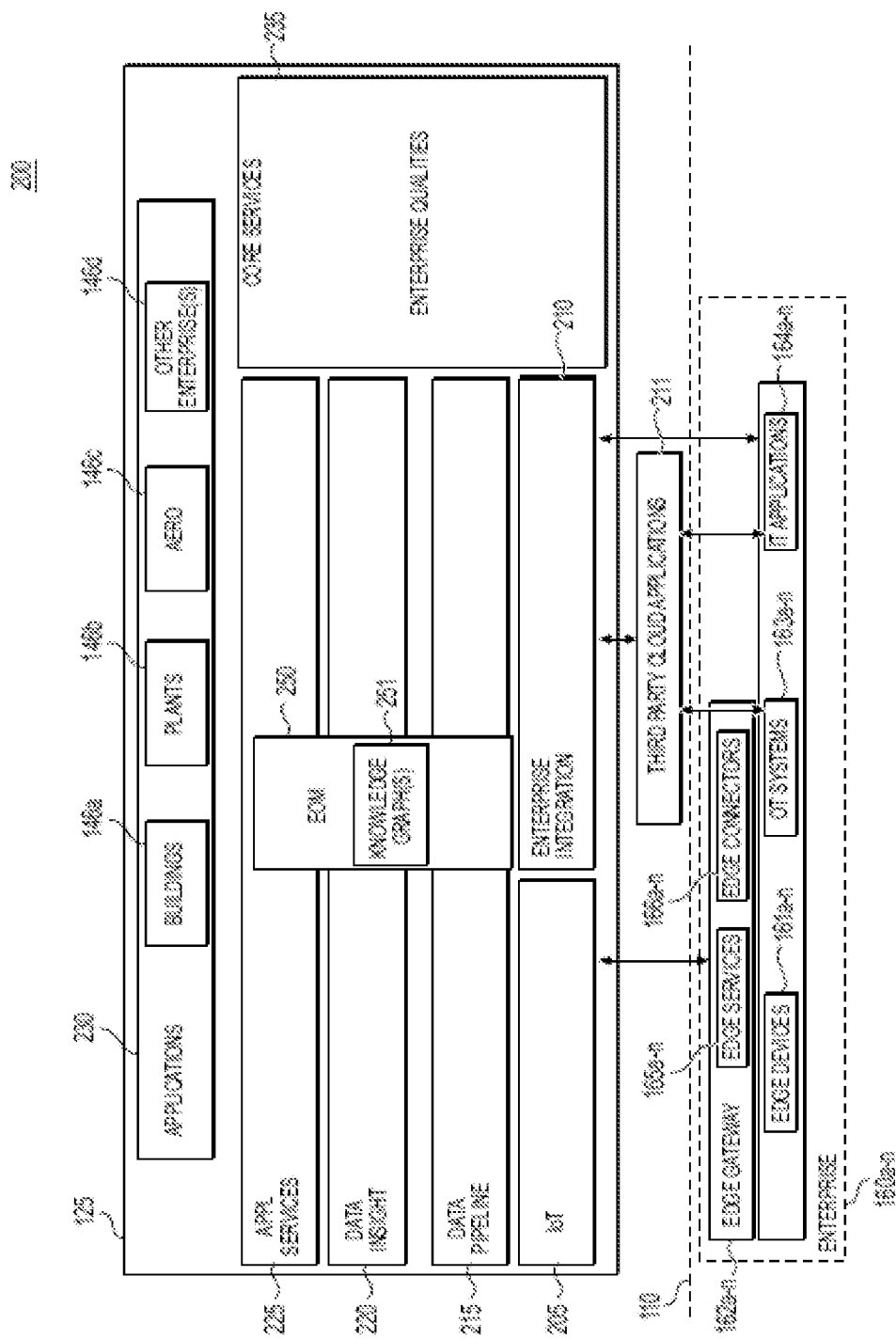
FIG. 2 depicts a schematic block diagram of a framework of an IoT platform of the networked computing system environment of FIG. 1, according to one or more embodiments.

The edge devices 161a-161n may represent any of a variety of different types of devices that may be found within the enterprises 160a-160n. Edge devices 161a-161n are any type of device configured to access network 110, or be accessed by other devices through network 110, such as via an edge gateway 162a-162n. Edge devices 161a-161n may be referred to in some cases as "IoT devices," which may therefore include any type of network-connected (e.g., Internet-connected) device. For example, the edge devices 161a-161n may include sensors, actuators, processors, computers, valves, pumps, ducts, vehicle components, cameras, displays, doors, windows, security components, HVAC components, factory equipment, and/or any other devices that may be connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, the edge 115 may also include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n include network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. The communication interfaces of the edge gateways 162a-162n may include one or more cellular radios, Bluetooth, WiFi, near-field communication radios, Ethernet, or other appropriate communication devices for transmitting and receiving information. Multiple communication interfaces may be included in each gateway 162a-162n for providing multiple forms of communication between the edge devices 161a-161n, the gateways 162a-162n, and the cloud 105 via network 110. For example, communication may be achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

The edge gateways 162a-162n may also include a processor and memory for storing and executing program instructions to facilitate data processing. For example, the edge gateways 162a-162n can be configured to receive data from the edge devices 161a-161n and process the data prior to sending the data to the cloud 105. Accordingly, the edge gateways 162a-162n may include one or more software modules or components for providing data processing services and/or other services or methods of the present disclosure. With reference to FIG. 2, each edge gateway 162a-162n includes edge services 165a-165n and edge connectors 166a-166n. The edge services 165a-165n may include hardware and software components for processing the data from the edge devices 161a-161n. The edge connectors 166a-166n may include hardware and software components for facilitating communication between the edge gateway 162a-162n and the cloud 105 via network 110, as detailed above. In some cases, any of edge devices 161a-n, edge connectors 166a-n, and edge gateways 162a-n may have their functionality combined, omitted, or separated into any combination of devices. In other words, an edge device and its connector and gateway need not necessarily be discrete devices.

According to an example embodiment, the edge gateways 162a-162n may be configured to receive at least one of telemetry data and model data from various physical assets of a facility or enterprise (e.g., but not limited to, a building, an industrial site, a vehicle, a warehouse, an aircraft etc.). In some examples, the telemetry data can represent time-series data and may include a plurality of data values associated with the assets which can be collected over a period of time. For instance, in an example, the telemetry data may represent a plurality of sensor readings collected by a sensor over a period of time. Further, the model data can represent metadata associated with the assets. The model data can be indicative of ancillary or contextual information associated with the asset. For instance, in an example, the model data can be representative of a geographical information associated with the asset (e.g. location of the asset) within a facility. In another example, the model data can represent a sensor setting based on which a sensor is commissioned within a facility. In yet another example, the model data can be representative of a data type or a data format associated with the data transacted through the asset. In yet another example, the model data can be indicative of any information which can define a relationship of the asset with the other assets in a facility. In accordance with various example embodiments described herein, the term 'model data' can be referred interchangeably as 'semantic model' or 'metadata' for purpose of brevity.

In accordance with an example embodiment, the edge gateways 162a-162n are configured to discover and identify one or more local devices and/or any other physical assets which are communicatively coupled to the edge gateways 162a-162n. Further, upon identification of the assets, the edge gateways 162a-162n are configured to pull the telemetry data and/or the model data from the various assets. In an example, these assets can correspond to one or more electronic devices that may be located on-premises in a facility. The edge gateways 162a-162n are configured to pull the data by sending one or more data interrogation requests to the assets. These data interrogation requests can be based on a protocol supported by an underlying physical asset. Examples of discovery and identification of assets in a facility are described in a U.S. patent application Ser. No. 16/888,626, titled "Remote discovery of building management system metadata", filed on 29 May 2020, the details of which are incorporated herein in their entirety.

In accordance with said example embodiment, the edge gateways 162a-162n are configured to receive the telemetry data and/or the model data in various data formats or different data structures. In an example, a format of the telemetry data and/or the model data, received at the edge gateways 162a-162n may be in accordance with a communication protocol of the network supporting transaction of data amongst two or more network nodes (i.e. the edge gateways 162a-162n and the asset). As can be appreciated, in some examples, each asset in a facility can be support different network protocols (e.g., IOT protocols like BACnet, Modbus, LonWorks, SNMP, MQTT, Foxs, OPC UA etc.). Accordingly, the edge gateways 162a-162n are configured to pull the telemetry data and/or the model data, in accordance with communication protocol supported by an underlying local device (i.e. asset).

Further, the edge gateways 162a-162n are configured to process the received data and transform the data into unified data format. The unified data format is referred hereinafter as a common object model (COM). In an example, the COM is in accordance with an object model that may be required by one or more data analytics applications or services, supported at the cloud 105. In an example embodiment, the edge gateways 162a-162n can perform data normalization to normalize the received data into a pre-defined data format. In an example, the pre-defined format can represent a COM based on which the edge gateways 162a-162n can further push the telemetry data and/or the model data to the cloud 106. In some examples, the edge gateways 162a-162n are configured to establish a secure communication channel with the cloud 105. In this regard, the data can be transacted between the edge gateways 162a-162n and the cloud 105, via a secure communication channel.

In accordance with said example embodiment, the edge gateways 162a-162n are configured to perform at least one of: (a) receiving at least one of: telemetry data and the model data from the assets, (b) normalizing the data which can include transforming the received data from a first format into a second format that supports a COM, and (c) sending the transformed data representative of the COM to the cloud 105. In accordance with some example embodiments, the edge gateways 162a-162n are configured to receive and aggregate the data (e.g., but not limited to, telemetry data and/or model data) from multiple sources in a facility. For instance, the data and/or metadata information can be received and/or pulled from multiple assets corresponding to various independent and diverse sub-systems in the facility. Furthermore, as described earlier, the edge gateways 162a-162n are configured to normalize the received data and send the normalized data to the cloud 105. In an example, the edge gateways 162a-162n can send the transformed data based on a data pull request received from the cloud 105. In another example, the edge gateways 162a-162n can send the transformed data automatically at pre-defined time intervals.

In an example embodiment, the edge gateways 162a-162n are configured to define a protocol for performing at least one of: (a) data ingress from the one or more assets to the edge gateways 162a-162n, (b) data normalization (e.g. normalizing the data into a COM), and (c) data egress for pushing the data out from the edge gateways 162a-162n (for example, to the cloud 105) In this regard, the edge gateways 162a-162n can be configured to define one or more rules based on which the data (i.e. the telemetry data and/or the model data) can be ingress by the edge gateways 162a-162n for further processing. Further, the edge gateways 162a-162n can define rules for normalizing the data in accordance with a COM, as described earlier. Furthermore, the edge gateways 162a-162n can include a rule engine that can be configured to define rules for egressing the data and/or a transformed version of the data (e.g. the normalized data) out from the edge gateways 162a-162n. In some examples, the edge gateways 162a-162n can ingress the data and further push the data into a data lake (e.g. a data pipeline). In an example, the data lake can be managed by the edge gateways 162a-162n and/or the cloud 105.

In accordance with an example embodiment, the edge gateways 162a-162n are configured to support one or more containerized packages. These containerized packages include one or more applications, drivers, firmware executable files, services, or the like, that can be configured based on configuration information from the cloud 105. These containerized packages supported at the edge gateways 162a-162n can pull the telemetry data and/or the model data from the one or more assets in the facility. Further, in accordance with some example embodiments, the edge gateways 162a-162n are configured to utilize the containerized packages to perform one or more operations corresponding to at least one of: the data ingress, the data normalization, and the data egress, as described earlier. Furthermore, the containerized packages can be configured to control one or more operations associated with the assets of the facility.

In accordance with some example embodiments, the containerized packages can include one or more drivers that can be configured to auto-discover and identify one or more assets in a facility. In this regard, the containerized packages can enable the edge gateways 162a-162n to remotely access the assets, identify the one or more assets based on the interrogation of the assets, and configure one or more data transaction capabilities of the assets. The data transaction capability referred herein can for example indicate, what data is to be pulled from an asset or how frequent data is to be pulled from the asset, or what metadata is to be pulled from the asset. In accordance with said example embodiments, the containerized packages can be utilized to configure at least one of: (a) a selection of data which is to be pulled from an asset, (b) a frequency at which the data is to be pulled from an asset, (c) selection of an asset from amongst the multiple assets from which the data is to be requested by the edge gateways 162a-162n, (d) a selection of metadata associated with an asset which is to be requested by the edge gateways 162a-162n. In an example embodiment, a containerized package at the edge gateways 162a-162n can include one or more of: drivers, native firmware, library files, application file, and/or executable files that can enable one or more functions as described herein, with respect to the edge gateways 162a-162n.

According to some example embodiments, the containerized packages can be configured to pull the data from the assets onto the edge gateways 162a-162n by sending data interrogation requests to various assets. These data interrogation assets can be defined in a format in accordance with a network protocol supported by the assets. Typically, various assets of a facility may support different network protocols (e.g. IOT based protocols like BACnet, Modbus, Foxs, OPC UA, Obix, SNMP, MQTT etc.). In some example embodiments, the containerized packages are customizable and user-configurable so as to cater any type of asset supported by any network protocol. In other words, the containerized packages can be configured to pull the data and/or the metadata from various assets regardless of an underlying network protocol for communication with an asset. In accordance with some example embodiments, the edge gateways 162a-162n can support the one or more containerized packages that can cause automatic discovery and identification of assets of various subsystems in a facility regardless of an asset type (e.g. modern sub-system or legacy sub-system, OEM manufactured, native asset etc.).

As described earlier, the edge gateways 162a-162n are configured to capture the data (e.g. the telemetry data and the semantic model) from various assets in the facility. Further, the edge gateways 162a-162n are configured to provide at least one of: the data and a COM determined from the data, to the cloud 105. In some example embodiments, the cloud 105 can further process the data and/or the COM to create an extended object model (EOM). An extended object model is representative of a data model which unifies several data ontologies, data relationships, and data hierarchies into a unified format. The EOM can be utilized for further data analytics and reporting one or more KPIs, contextual insights, performance, and operational insights of a facility.

In some embodiments, the COM and/or the EOM may generate and/or suggest filter tags for the data. In other words, the COM and/or the EOM may ingest telemetry data and, using contextual information about the data (e.g. the semantic model), may assign filter tags to the data. The filter tags may accordingly be used to filter the potentially large amounts of data to desired granularity. In some embodiments, the COM and/or the EOM may assign geographic filter tags, filter tags identifying specific facilities, asset type filter tags, attribute filter tags, time series filter tags, or any other type of filter tags useful for sorting the data. For example, for a data element indicative of energy consumed by an individual boiler in a warehouse in Bangalore, the COM and/or the EOM may apply filter tags indicative of one or more of: the boiler, the system with which the boiler is associated, the warehouse, Bangalore, energy consumption, the sensor or meter used to detect the energy consumption, and the like. The COM and/or the EOM may assign filter tags to each data element ingested and/or maintained therein.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, each layer 205-235 may include one or more of the modules 141, models 142, engines 143, databases 144, services 145, applications 146, or combinations thereof. In some embodiments, the layers 205-235 may be combined to form fewer layers. In some embodiments, some of the layers 205-235 may be separated into separate, more numerous layers. In some embodiments, some of the layers 205-235 may be removed while others may be added.

The IoT platform 125 is a model-driven architecture. Thus, the extensible object model 250 communicates with each layer 205-230 to contextualize site data of the enterprise 160a-160n using an extensible object model (or "asset model") and knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 may include resource description framework (RDF) graphs. As used herein, a "RDF graph" is a graph data model that formally describes the semantics, or meaning, of information. The RDF graph can also represent metadata (e.g., data that describes data). Knowledge graphs 251 can also include a semantic object model. The semantic object model is a subset of a knowledge graph 251 that defines semantics for the knowledge graph 251. For example, the semantic object model defines the schema for the knowledge graph 251.

As used herein, EOM 250 is a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, the model can describe the type of sensors mounted on any given asset (e.g., edge device 161a-161n) and the type of data that is being sensed by each sensor. A key performance indicator (KPI) framework can be used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 can understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 251 can automatically map the tag to the attribute based on naming conventions, parsing, and matching the tag and attribute descriptions and/or by comparing the behavior of the time series data with expected behavior.

The modeling phase includes an onboarding process for syncing the models between the edge 115 and the cloud 105. For example, the onboarding process can include a simple onboarding process, a complex onboarding process, and/or a standardized rollout process. The simple onboarding process includes the knowledge graph 251 receiving raw model data from the edge 115 and running context discovery algorithms to generate the model. The context discovery algorithms read the context of the edge naming conventions of the edge devices 161a-161n and determine what the naming conventions refer to. For example, the knowledge graph 251 can receive "TMP" during the modeling phase and determine that "TMP" relates to "temperature." The generated models are then published. The complex onboarding process includes the knowledge graph 251 receiving the raw model data, receiving point history data, and receiving site survey data. The knowledge graph 251 can then use these inputs to run the context discovery algorithms. The generated models can be edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, data can be ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT layer 205. In some embodiments, only authorized data is sent to the IoT platform 125, and the IoT platform 125 only accepts data from authorized edge gateways 162a-162n and/or edge devices 161a-161n. Data may be sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. The IoT layer 205 may also include components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third party applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, the data pipeline layer 215 can pre-process and/or perform initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. The enterprise-specific digital twins can include a reliability advisor containing process models to determine the current operation and the fault models to trigger any early detection and determine an appropriate resolution. The digital twins can also include an optimization advisor that integrates real-time economic data with real-time process data, selects the right feed for a process, and determines optimal process conditions and product yields.

The data pipeline layer 215 may also use models and templates to define calculations and analytics, and define how the calculations and analytics relate to the assets (e.g., the edge devices 161a-161n). For example, a pump template can define pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. The actual calculation or analytic logic may be defined in the template or it may be referenced. Thus, the calculation model can be used to describe and control the execution of a variety of different process models. Calculation templates can be linked with the asset templates such that when an asset (e.g., edge device 161a-161n) instance is created, any associated calculation instances are also created with their input and output parameters linked to the appropriate attributes of the asset (e.g., edge device 161a-161n).

The IoT platform 125 can support a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, the IoT platform 125 can drill down from a high-level condition to understand the contributing factors, as well as determining the potential impact a lower level condition may have. There may be multiple fault models for a given enterprise 160a-160n looking at different aspects such as process, equipment, control, and/or operations. Each fault model can identify issues and opportunities in their domain, and can also look at the same core problem from a different perspective. An overall fault model can be layered on top to synthesize the different perspectives from each fault model into an overall assessment of the situation and point to the true root cause.

When a fault or opportunity is identified, the IoT platform 125 can make recommendations about the best corrective actions to take. Initially, the recommendations are based on expert knowledge that has been pre-programmed into the system by process and equipment experts. A recommendation services module presents this information in a consistent way regardless of source, and supports workflows to track, close out, and document the recommendation follow-up. The recommendation follow-up can be used to improve the overall knowledge of the system over time as existing recommendations are validated (or not) or new cause and effect relationships are learned by users and/or analytics.

The models can be used to accurately predict what will occur before it occurs and interpret the status of the installed base. Thus, the IoT platform 125 enables operators to quickly initiate maintenance measures when irregularities occur. The digital twin architecture of the IoT platform 125 can use a variety of modeling techniques. The modeling techniques can include, for example, rigorous models, fault detection and diagnostics (FDD), descriptive models, predictive maintenance, prescriptive maintenance, process optimization, and/or any other modeling technique.

The rigorous models can be converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. The descriptive models identify a problem and then the predictive models can determine possible damage levels and maintenance options. The descriptive models can include models for defining the operating windows for the edge devices 161a-161n.

Predictive maintenance includes predictive analytics models developed based on rigorous models and statistic models, such as, for example, principal component analysis (PCA) and partial least square (PLS). Machine learning methods can be applied to train models for fault prediction. Predictive maintenance can leverage FDD-based algorithms to continuously monitor individual control and equipment performance. Predictive modeling is then applied to a selected condition indicator that deteriorates in time. Prescriptive maintenance includes determining what is the best maintenance option and when it should be performed based on actual conditions rather than time-based maintenance schedule. Prescriptive analysis can select the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TSDB), relational/document databases, data lakes, blob, files, images, and videos, and/or an API for data query. When raw data is received at the IoT platform 125, the raw data can be stored as time series tags or events in warm storage (e.g., in a TSDB) to support interactive queries and to cold storage for archive purposes. Data can further be sent to the data lakes for offline analytics development. The data pipeline layer 215 can access the data stored in the databases of the data insight layer 220 to perform analytics, as detailed above.

The application services layer 225 includes one or more components for rules engines, workflow/notifications, KPI framework, BI, machine learning, and/or an API for application services. The application services layer 225 enables building of applications 146a-d. The applications layer 230 includes one or more applications 146a-d of the IoT platform 125. For example, the applications 146a-d can include a buildings application 146a, a plants application 146b, an aero application 146c, and other enterprise applications 146d. The applications 146 can include general applications 146 for portfolio management, asset management, autonomous control, and/or any other custom applications. Portfolio management can include the KPI framework and a flexible user interface (UI) builder. Asset management can include asset performance and asset health. Autonomous control can include energy optimization and predictive maintenance. As detailed above, the general applications 146 can be extensible such that each application 146 can be configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill-downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. The core services layer 235 can include data visualization, data analytics tools, security, scaling, and monitoring. The core services layer 235 can also include services for tenant provisioning, single login/common portal, self-service admin, UI library/UI tiles, identity/access/entitlements, logging/monitoring, usage metering, API gateway/dev portal, and the IoT platform 125 streams.

With reference to FIGS. 3-6, features for modifying EOM 250 and/or knowledge graphs 251 will be hereinafter described in detail. The features described herein relate generally to utilizing EOM 250 and/or knowledge graphs 251 to generate a spatial hierarchy that a user may utilize to identify the locations of objects in an enterprise and the relationships those objects have with other objects. A visual representation of the spatial hierarchy may be accessed via a user device such as, for example, a desktop computer, a mobile device, etc. In some embodiments, the user device may be a cellphone, a tablet, an artificial reality AR device such as a headset, or the like. In some embodiments, the user device may include one or more end user application(s), e.g., a program, plugin, browser, browser extension, etc., installed on a memory of the user device. The end user application(s) may be associated with the IoT platform 125 and may allow a user of the user device to access features and/or information provided by IoT platform 125. In some embodiments, the end user application may be a browser and IoT platform 125 may be made available to the user via a web-based application.

Figure 3:
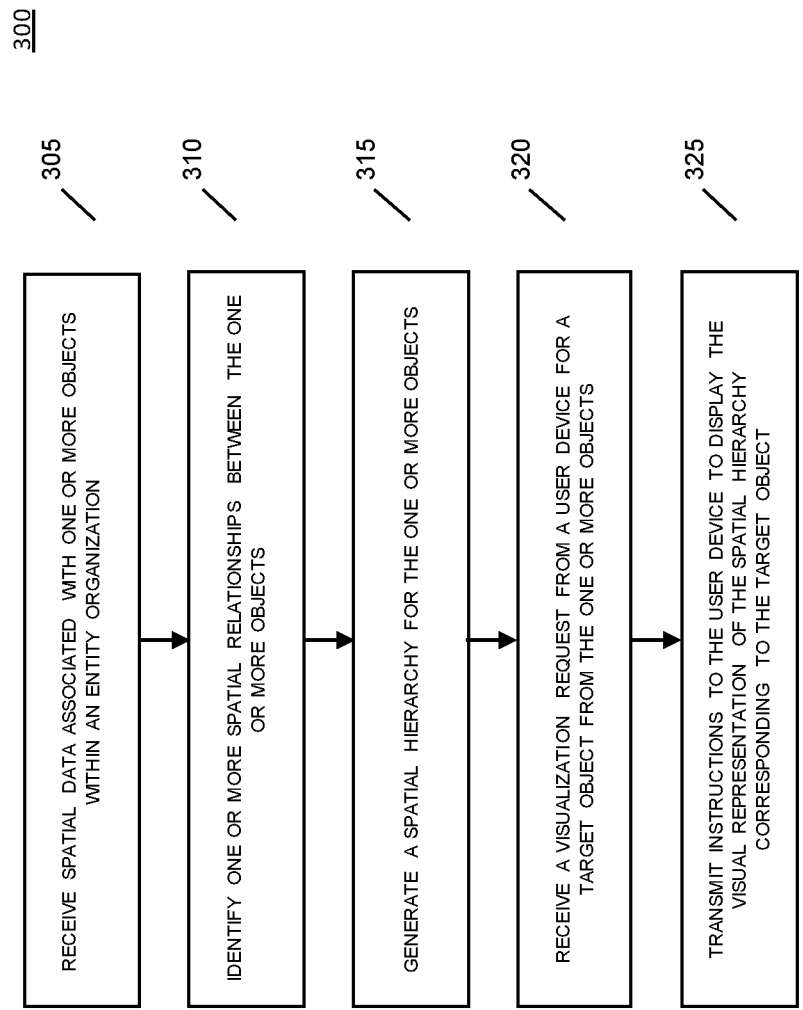
FIG. 3 depicts an exemplary flowchart of a method of transmitting instructions to a user device to display a visual representation of a spatial hierarchy, according to one or more embodiments.

FIG. 3 illustrates a flowchart of an exemplary method 300 for generating a spatial hierarchy model and displaying that model on a user device. The method 300 may be implemented by system environment 100 and may utilize some or all aspects of EOM 250 and/or Knowledge Graphs 251 of the IoT Platform 125.

At step 305, an embodiment may receive or collect spatial data associated with one or more objects associated with an enterprise. In the context of this application, the one or more objects may correspond to one or more of: spaces within an enterprise (e.g., rooms, hallways, public spaces, etc.), assets contained within the enterprise (e.g., devices, components, systems, equipment, etc.), sensors utilized in the enterprise (e.g., temperature sensors, light sensors, motion sensors, etc.), and the like. In the context of this application, spatial data may correspond to a location within the facility where each of the objects are located (e.g., the building, floor, and/or room in which an object is located, etc.). Additionally or alternatively, the spatial data may also include additional contextual information associated with object. This contextual information may include, for example, object attributes/properties (e.g., the names of the components/parts that constitute the object, the date those components were built and/or installed into the object, etc.), KPIs associated with the object (e.g., object availability, mean time before failure, etc.), past service history, and the like.

In an embodiment, the spatial data for objects may be gleaned from a variety of different data sources. For instance, the spatial data may be obtained from one or more of: a database, an image, building blueprints and/or floor plans, and the like. In an embodiment, the collection of the spatial data may occur substantially at a single time point. For example, at Time X all of an enterprise client's available spatial data for their objects may be retrieved. Alternatively, the collection of the spatial data may occur iteratively over time. For example, many enterprises have at least some spatial data stored in their systems in some format that can be easily exported (e.g., to Excel format, etc.). Additional information, such as floor plans, images, etc., may later be retrieved and incorporated with the originally obtained spatial data.

At step 310, an embodiment may identify one or more relationships between the one or more objects. In this regard, an embodiment may leverage the EOM 251 of the IOT platform 125 to deduce which objects in the enterprise have an effect on one another and what that effect is. For example, the EOM 251 may indicate that a component (e.g., an A/C unit) relies on data obtained from a particular sensor (e.g., temperature sensor) to function properly. As another example, the EOM 251 may indicate that a component (e.g., an A/C unit) effects aspects of a particular space (e.g., the temperature in rooms 1-3 is controlled by the A/C unit). In an embodiment, relationships may be identified as direct relationships or indirect relationships. For example, with respect to the former, a device installed on a particular floor, or that effects a primary aspect of a room (e.g., such as temperature, etc.), may be considered to have a direct impact on that floor or room. As another example, with respect to the latter, a device installed on a particular floor of a building may be considered to have an indirect impact on that building.

At step 315, an embodiment may utilize the spatial data and the relationship data to generate a spatial hierarchy for the one or more objects. In the context of this application, the spatial hierarchy may be a digital twin of the enterprise, or a portion thereof, and may be utilized to explore relationships between the complex webs of objects contained at various locations within the enterprise. From a maintenance perspective, the spatial hierarchy may be especially useful to enable maintenance personnel to quickly and easily identify where a target object is located within the enterprise as well as other contextual information that may be helpful (e.g., the direct and/or indirect impacts the target object has with other objects, the attributes/properties of the target object, the service history of the target object, and the like). In an embodiment, different characteristics of the spatial hierarchy may be visually distinguished from each other to promote ease of analysis. For example, the attributes of an asset may be visually distinguished from the KPIs associated with the asset (e.g., by presenting each of these data points in different colors). As another example, the impact levels associated with a service request may be visually distinguished from one another (e.g., a service request having a direct impact on an object may be outlined in red, a service request having an indirect impact on an object may be outlined in blue, etc.).

It should be noted that EOM 250 and/or knowledge graphs 251 define the schema by which elements of IoT platform 125 may be associated with each other. For example, an asset may be associated with a floor of a building by virtue of its position on the floor of the building. Similarly, an asset may be associated with another asset by virtue of the assets being related components of the same system. EOM 250 and/or knowledge graphs 251 may, however, prohibit an element of IoT platform 125 from being associated with another element in a nonsensical fashion. For example, EOM 250 and/or knowledge graphs 251 may prohibit an association between a location and an asset that suggests that the location is positioned within the asset.

Figure 4:
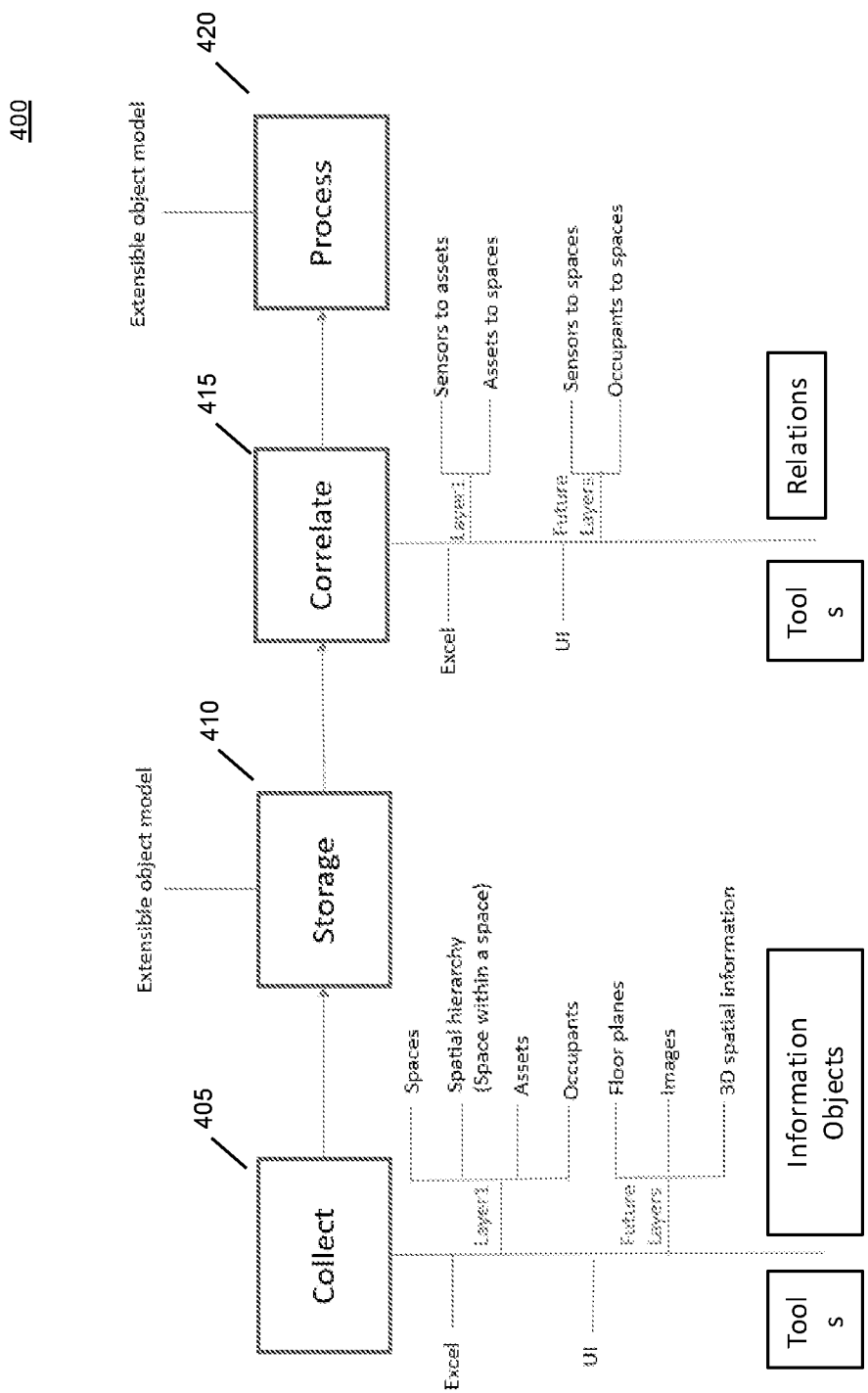
FIG. 4 depicts an exemplary diagram for generating a spatial hierarchy, according to one or more embodiments.
Figure 5:
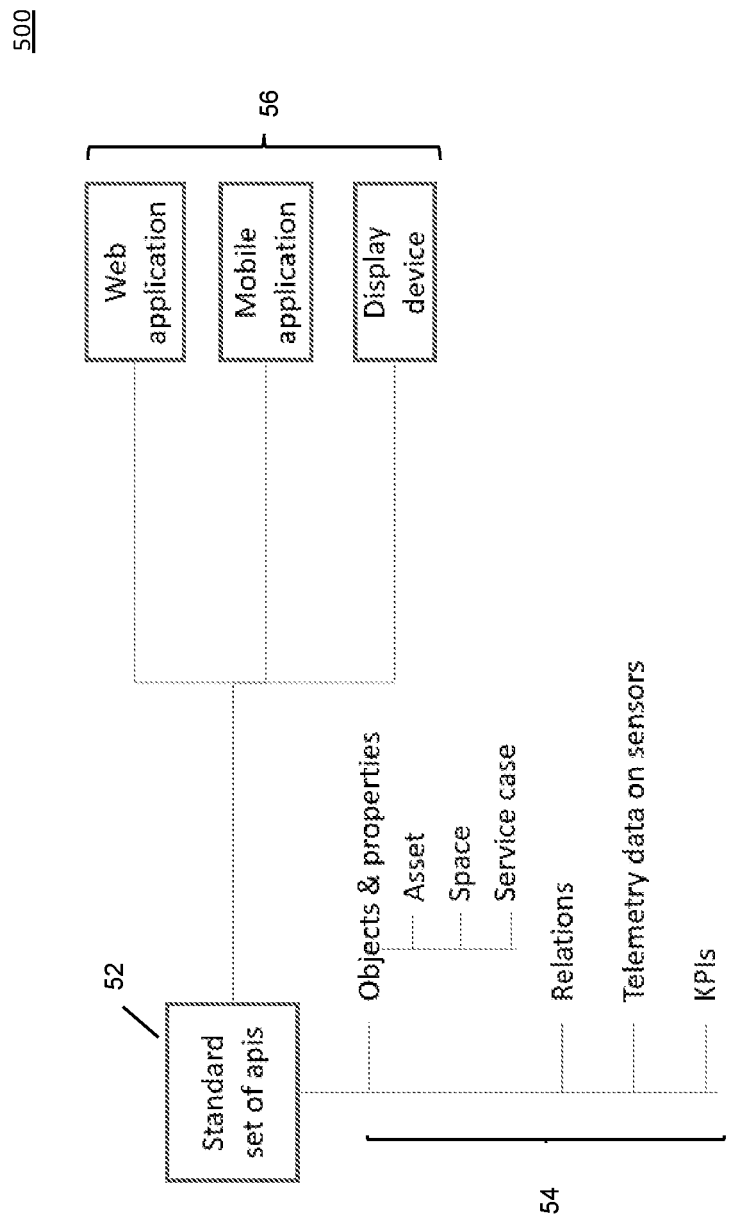
FIG. 5 depicts an exemplary diagram for presenting a spatial hierarchy to user devices, according to one or more embodiments.

FIG. 4 illustrates an exemplary diagram 400 of a layered approach to generating a spatial hierarchy. At 405, an embodiment may first collect available spatial data associated with an enterprise. In this regard, an embodiment may receive, from a customer system, any available spatial data information. The received spatial data may be very basic (e.g., just an identification that an object exists somewhere in the enterprise, etc.) and may exist in a format native to the customer system. The received data may be transformed and exported to a spreadsheet format (e.g., such as Microsoft Excel), at which point various types of vlookup functions may be utilized to prepare the data (i.e., identify spaces, assets, occupants, components, etc.). The foregoing process may be considered to be an initial, or first, layer of data collection and analysis. Subsequent layers of data collection may later be implemented to augment the knowledge that the system environment 100 has of the enterprise. For instance, individuals may interact with a user interface of the system environment 100 to provide floor plans, images, 3D spatial information, etc., to the system environment 100.

At step 410, the data may be stored in an accessible storage location. For instance, the collected spatial data for an enterprise may be stored in a cloud environment 105. In some example embodiments, the cloud 105 can further process the spatial data to create an EOM. The EOM may be representative of a data model which unifies several data ontologies, data relationships, and data hierarchies into a unified format. The EOM may be utilized for further data analytics and reporting one or more KPIs, contextual insights, performance, and operational insights of an enterprise. In an embodiment, as additional spatial data is collected (e.g., from the subsequent layers of data collection) the EOM may be updated.

At step 415, one or more correlations may be deduced about the relationships that objects within the enterprise have with one another. Similar to step 405, these correlations may be deduced in a layered approach. For example, certain basic correlations may be deduced in a first layer from the initial spatial data obtained about the objects in an enterprise (e.g., a relationship of a sensor to an asset, a relationship of an asset to a space). As additional spatial data is received in future layers, the ability of the system environment 100 to define more specific and granular relationships may be enhanced (e.g., a relationship of a sensor to a space, a relationship of occupants to a space, etc.).

At step 420, these correlations may be processed by the EOM 250 in order to form a complete spatial hierarchy. This hierarchy may contain the analytics and contextual insights to not only construct a spatial rendition, or digital twin, of the enterprise, but may also be used to clearly delineate relationships between the objects contained therein.

Referring back to FIG. 3, at step 320, an embodiment may receive a visualization request from a user device. The user device may be any device used to access IoT platform 125. The visualization request may indicate that a user of the user device desires for a visual representation of the spatial hierarchy to be displayed. The visualization request may be, for example, associated with a service request. For instance, the visualization request may be transmitted by a maintenance personnel responding to the service request. In an embodiment, the visualization request may be a request to view the generated spatial hierarchy of the enterprise in its entirety (e.g., including all determined object characteristics and relationships). Additionally or alternatively, the visualization request may be a request to view details associated with a specific target object within the spatial hierarchy (e.g., where the target object is located in the spatial hierarchy, additional contextual information associated with the target object, the relationship the target object has with other objects in the spatial hierarchy, and the like).

At 325, an embodiment may transmit instructions to the user device to display a visual representation of the spatial hierarchy on a display screen associated therewith. In an embodiment, the visual representation of the spatial hierarchy may be distributed to various user devices utilizing a standard set of APIs. More particularly, with reference to the diagram 500 illustrated in FIG. 5, a standard set of APIs 52 may be leveraged to expose the spatial hierarchy data 54 in a consistent way across a plurality of different user touch points 56 (e.g., web application, mobile application, display device, etc.).

In an embodiment, the visual representation may include a presentation of the entirety of the spatial hierarchy. Additionally or alternatively, in a situation where a specific object is desired to be viewed, additional data metrics may be included in the spatial hierarchy that are associated with that object. For instance, various characteristics of the target object may be displayed (e.g., attributes/properties, KPI, service history, etc.) and/or an indication of the type of relationship the target object has with one or more other objects may also be made apparent.

It is to be understood that method 300 need not necessarily be performed in the exact order described herein and the steps described herein may be rearranged in some embodiments. Further, in some embodiments fewer than all steps of method 300 may be performed and in some embodiments additional steps may be performed.

Figure 6:
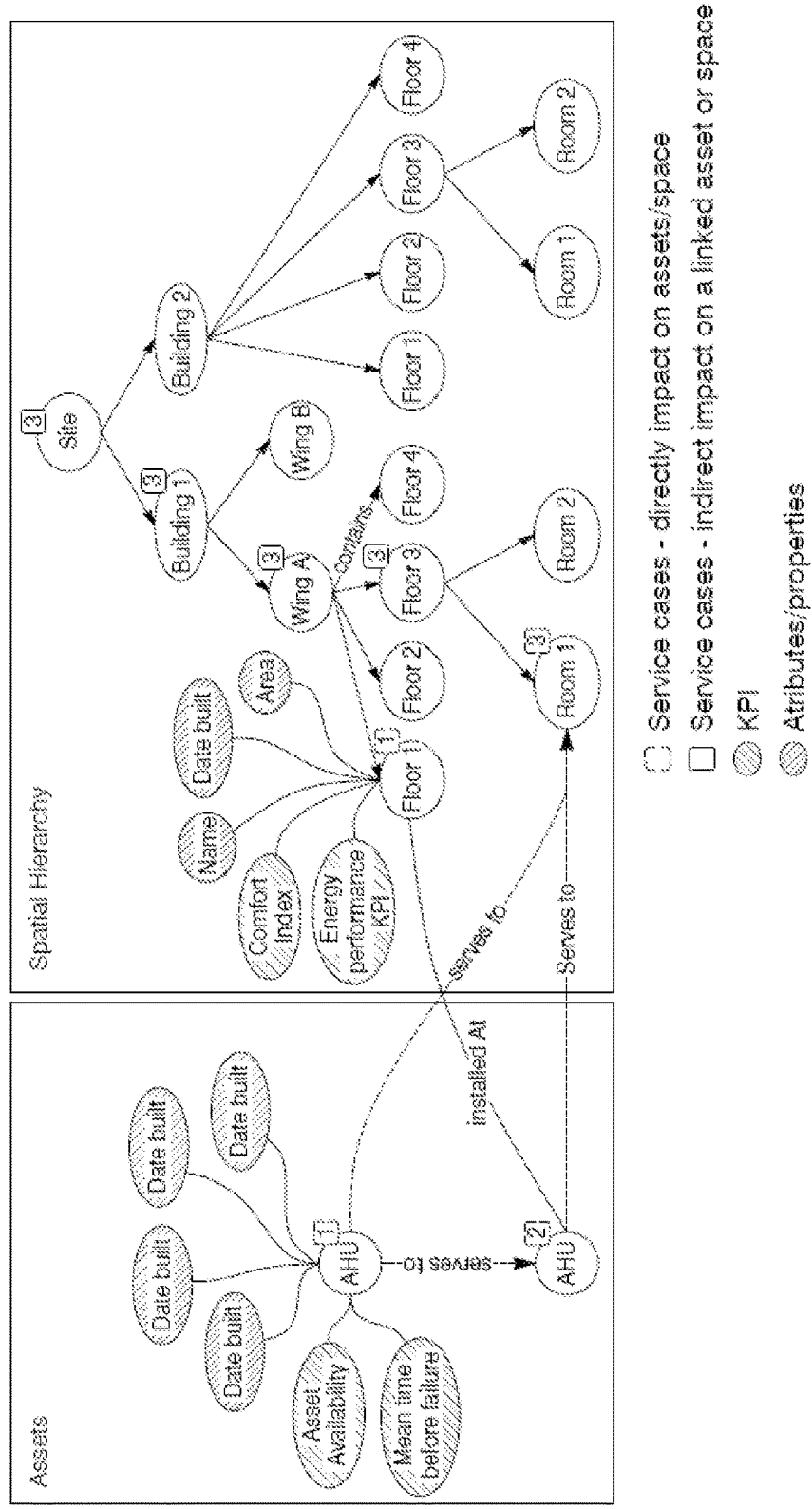
FIG. 6 depicts an exemplary visual representation of a spatial hierarchy in a graphical user interface, according to one or more embodiments.

Turning now to FIG. 6, a non-limiting exemplary illustration 600 of a spatial hierarchy for a designated site of an enterprise is provided. The spatial composition of the site may be deduced from a simple examination of the spatial hierarchy. For instance, It can be seen that the site is composed of two buildings, each of which contain various types of sub-spaces including wings (e.g., Wing A and Wing B for Building 1), floors (e.g., floors 1-4 in building 1, floors 1-4 of building 2), rooms on each floor, and the like. Although not explicitly illustrated, a user may select any of these spaces or sub-spaces to obtain additional information regarding that space. For instance, a user selecting Floor 1 of Wing A in Building 1 may be provided with additional information such as the name of the floor, the date it was built, identities of its primary occupants, indications of the assets contained therein, the performance of these assets, and the like. In an embodiment, a diagram key may be provided to the user device in conjunction with the visual representation of the spatial hierarchy to enable users to more quickly understand the relationships that objects have with one another.

In an embodiment, the spatial hierarchy may further contain associations between a specific target object and other objects that it may be linked to. For example, a maintenance personnel may be tasked with addressing an issue with a specific asset, such as an Air Handling Unit (AHU). Upon receiving the visualization request that identifies the AHU as a target object, a visual representation of the spatial hierarchy may be provided to the maintenance personnel that identifies various characteristics associated with the AHU (e.g., the components that compose the AHU and/or the dates that they were built or installed, KPI associated with the AHU, etc.) as well as the direct and/or indirect relationships the AHU has with other objects in the spatial hierarchy. More particularly, an examination of the illustration 600 may reveal that AHU is installed at Floor 1 and controls airflow characteristics of Room 1 on Floor 3. Accordingly, it can be deduced that the AHU has a direct impact on Floor 1 (i.e., because it is installed there), it has a direct impact on Room 1 on Floor 3 (i.e., because it controls airflow characteristics there), it has an indirect impact on Floor 3 (i.e., because it controls airflow characteristics in one of the rooms on this floor), and it has an indirect impact on Wing A and Building 1 of the Site because it is a component in that spatial hierarchy.

Figure 7:
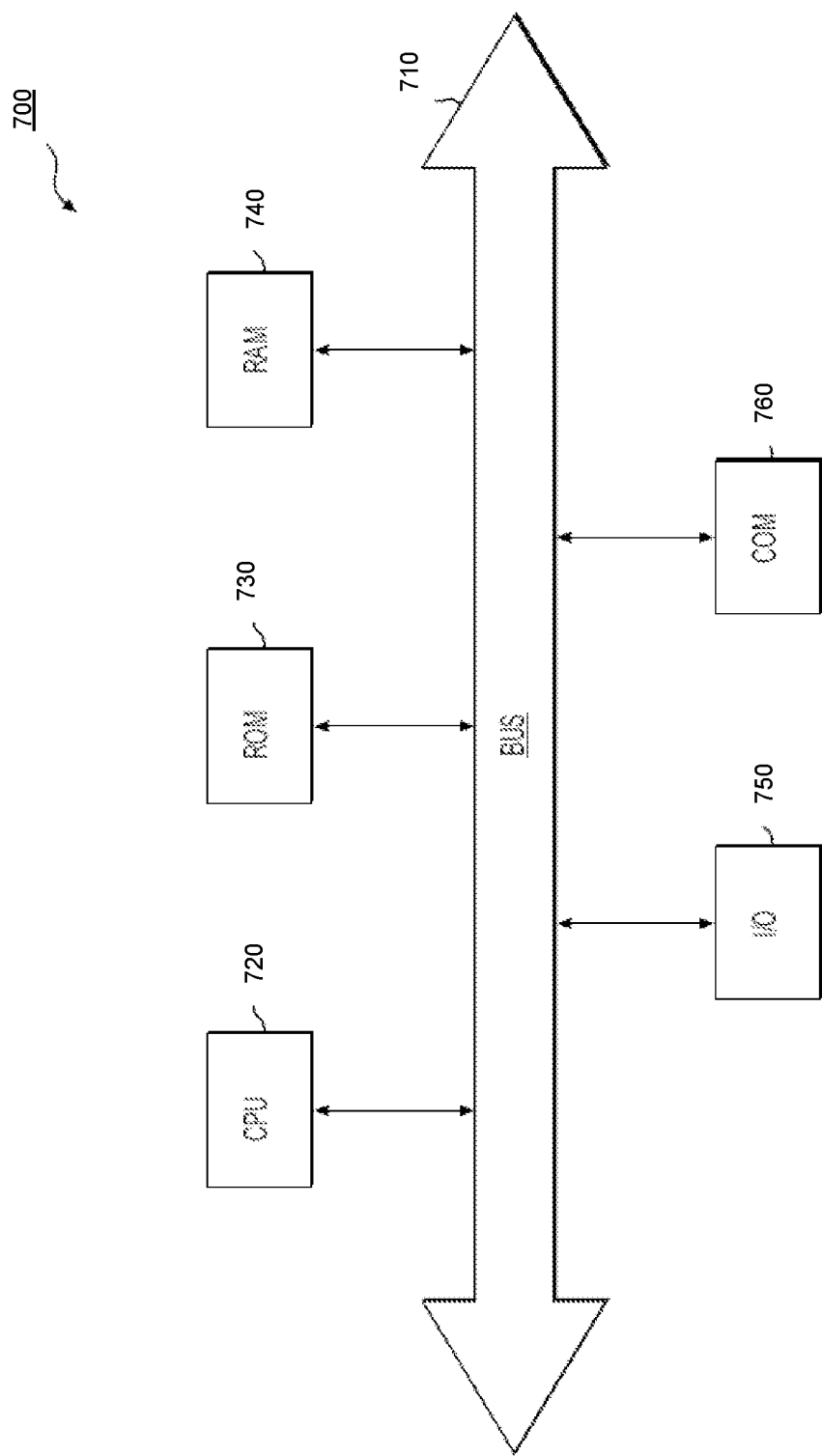
FIG. 7 depicts an exemplary system that may execute techniques presented herein.

FIG. 7 depicts an example system that may execute techniques presented herein. FIG. 7 is a simplified functional block diagram of a computer that may be configured to execute techniques described herein, according to exemplary embodiments of the present disclosure. Specifically, the computer (or "platform" as it may not be a single physical computer infrastructure) may include a data communication interface 760 for packet data communication. The platform may also include a central processing unit ("CPU") 720, in the form of one or more processors, for executing program instructions. The platform may include an internal communication bus 710, and the platform may also include a program storage and/or a data storage for various data files to be processed and/or communicated by the platform such as ROM 730 and RAM 740, although the system 700 may receive programming and data via network communications. The system 700 also may include input and output ports 750 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems and/or methods may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the internet or various other telecommunication networks. Such communications, for example, may enable loading of the software from one computer or processor into another, for example, from a management server or host computer of a mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, "one or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first selection could be termed a second selection, and, similarly, a second selection could be termed a first selection, without departing from the scope of the various described embodiments. The first selection and the second selection are both selections, but they are not the same selection.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

In this disclosure, relative terms, such as, for example, "about," "substantially," "generally," and "approximately" are used to indicate a possible variation of ±10% in a stated value.

The term "exemplary" is used in the sense of "example" rather than "ideal."

Other embodiments of the disclosure will be apparent to those skilled in the art from consideration of the specification and practice of the embodiments disclosed herein. It is intended that the specification and examples be considered as exemplary only, with a true scope and spirit of the present disclosure being indicated by the following claims.

What is claimed is:

1. A method, comprising:
    receiving, at a system comprising at least one processor, spatial data associated with one or more objects within an entity organization, wherein the spatial data comprises object characteristic data associated with each of the one or more objects, wherein the object characteristic data comprises at least a key performance indicator of the one or more objects within the entity organization;
    identifying, using the at least one processor and from the spatial data, one or more relationships between the one or more objects;
    generating, using the at least one processor and based on the identifying, a spatial hierarchy for the one or more objects;
    receiving, at the system from a user device, a visualization request for a target object from the one or more objects; and
    transmitting, by the system and responsive to the receiving, instructions to the user device to display a visual representation of at least a portion of the spatial hierarchy corresponding to the target object, wherein the visual representation comprises indications of at least a first subset of the one or more objects directly impacted by the visualization request for the target object and at least a second subset of the one or more objects indirectly impacted by the visualization request for the target object.

2. The method of claim 1, wherein the one or more objects comprise one or more of: an asset, a space, and a component.

3. The method of claim 1, wherein the receiving the spatial data comprises receiving the spatial data at a plurality of different time points,
    wherein initial spatial data is received at a first time point in the plurality of different time points, and
    wherein additional spatial data is received at one or more later time points in the plurality of different time points.

4. The method of claim 1, wherein the object characteristic data comprises one or more of: an attribute, and a service history.

5. The method of claim 1, wherein the visual representation of the at least a portion of the spatial hierarchy comprises a plurality of nodes connected together by a plurality of edges,
    wherein each of the plurality of nodes corresponds to one of the one or more objects, and
    wherein each of the plurality of edges corresponds to a relationship between two objects of the one or more objects.

6. The method of claim 1, wherein the visualization request is indicative of a service request to address an issue with the target object.

7. The method of claim 6, wherein the first subset of the one or more objects directly impacted by the service request are visually distinguished from the second subset of the one or more objects indirectly impacted by the service request on the visual representation.

8. The method of claim 1, further comprising:
    receiving, from the user device, modification input; and
    updating one or more aspects of the spatial hierarchy based on the received modification input.

9. A system, comprising:
    one or more memories storing instructions; and
    one or more processors operatively connected to the one or more memories, the one or more processors configured to execute the instructions to:
        receive spatial data associated with one or more objects within an entity organization, wherein the spatial data comprises object characteristic data associated with each of the one or more objects, wherein the object characteristic data comprises at least a key performance indicator of the one or more objects within the entity organization;
        identify from the spatial data, one or more relationships between the one or more objects;
        generate, based on the identifying, a spatial hierarchy for the one or more objects;
        receive, at the system from a user device, a visualization request for a target object from the one or more objects; and
        transmit, by the system and responsive to the receiving, instructions to the user device to display a visual representation of at least a portion of the spatial hierarchy corresponding to the target object, wherein the visual representation comprises indications of at least a first subset of the one or more objects directly impacted by the visualization request for the target object and at least a second subset of the one or more objects indirectly impacted by the visualization request for the target object.

10. The system of claim 9, wherein the one or more objects comprise one or more of:
an asset, a space, and a component.

11. The system of claim 9, wherein the instructions executable by the one or more processors to receive the spatial data comprise instructions executable by the one or more processors to receiving the spatial data at a plurality of different time points,
wherein initial spatial data is received at a first time point in the plurality of different time points, and
wherein additional spatial data is received at one or more later time points in the plurality of different time points.

12. The system of claim 9, wherein the object characteristic data comprises one or more of: an attribute, and a service history.

13. The system of claim 9, wherein the visual representation of the at least a portion of the spatial hierarchy comprises a plurality of nodes connected together by a plurality of edges,
wherein each of the plurality of nodes corresponds to one of the one or more objects, and
wherein each of the plurality of edges corresponds to a relationship between two objects of the one or more objects.

14. The system of claim 9, wherein the visualization request is indicative of a service request to address an issue with the target object.

15. The system of claim 14, wherein the first subset of the one or more objects directly impacted by the service request are visually distinguished from the second subset of the one or more objects indirectly impacted by the service request on the visual representation.

16. The system of claim 9, wherein the instructions are further executable by the one or more processors to:
receive, from the user device, modification input; and
update one or more aspects of the spatial hierarchy based on the received modification input.

17. A non-transitory computer-readable medium storing computer-executable instructions which, when executed by a server in network communication with at least one database, cause the server to perform operations comprising:
receiving, at a system comprising at least one processor, spatial data associated with one or more objects within an entity organization, wherein the spatial data comprises object characteristic data associated with each of the one or more objects, wherein the object characteristic data comprises at least a key performance indicator of the one or more objects within the entity organization;
identifying, using the at least one processor and from the spatial data, one or more relationships between the one or more objects;
generating, using the at least one processor and based on the identifying, a spatial hierarchy for the one or more objects;
receiving, at the system from a user device, a visualization request for a target object from the one or more objects; and
transmitting, by the system and responsive to the receiving, instructions to the user device to display a visual representation of at least a portion of the spatial hierarchy corresponding to the target object, wherein the visual representation comprises indications of at least a first subset of the one or more objects directly impacted by the visualization request for the target object and at least a second subset of the one or more objects indirectly impacted by the visualization request for the target object.

* * * * *